(12) United States Patent
Khan et al.

(10) Patent No.: US 6,367,000 B1
(45) Date of Patent: *Apr. 2, 2002

(54) FAST CONVERSION OF ENCODED TAG BITS

(75) Inventors: Arif I. Khan; Elango Ganesan; Michael C. Kim, all of Sunnyvale, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/164,394

(22) Filed: Sep. 30, 1998

(51) Int. Cl.[7] .................................... G06F 15/00
(52) U.S. Cl. ............................................ 712/32
(58) Field of Search ........................ 712/23, 32, 42

(56) References Cited

U.S. PATENT DOCUMENTS

| | | | | |
|---|---|---|---|---|
| 4,730,248 A | * | 3/1988 | Watanabe et al. | 712/228 |
| 5,590,359 A | * | 12/1996 | Sharangpani et al. | 712/32 |
| 5,600,806 A | * | 2/1997 | Brown et al. | 712/204 |
| 5,835,793 A | * | 11/1998 | Li et al. | 712/300 |
| 5,854,939 A | * | 12/1998 | Wollan et al. | 712/41 |
| 5,892,966 A | * | 4/1999 | Petrick et al. | 712/36 |
| 5,982,966 A | * | 4/1999 | Petrick et al. | 712/36 |
| 5,974,535 A | * | 10/1999 | Peng et al. | 712/215 |

* cited by examiner

Primary Examiner—David Y. Eng
(74) Attorney, Agent, or Firm—Blakely, Sokoloff, Taylor & Zafman LLP

(57) ABSTRACT

The present invention is a method and apparatus for converting a first tag word into a second tag word which correspond to a set of registers. Adjacent bits in the first tag word are determined which correspond to different registers in the set of registers. The determined adjacent bits in the first tag word are extracted and deposited into corresponding adjacent bit positions in the second tag word.

30 Claims, 4 Drawing Sheets

FAST CONVERSION OF ENCODED TAG BITS

BACKGROUND

1. Field of the Invention

This invention relates to microprocessor systems. In particular, the invention relates to conversion of tag bits.

2. Description of Related Art

An execution unit in a microprocessor performs a number of operations including arithmetic and logic operations. The inputs to these operations or the results of these operations are usually stored in a set of arithmetic or logic registers. The status or conditions of these registers are stored in tag registers. The tag registers contain the tag bits that are encoded to represent the status of the corresponding arithmetic or logic registers.

When the state of the processor is saved as a result of an execution of a save instruction, the content of the tag register is saved together with other pertinent information. In a context switch, it is desirable to save the content of the tag register as fast as possible. At the same time, a new processor should also maintain software compatibility with an existing processor. It is therefore necessary to keep the existing tag register while providing a new tag register that is used by a new save instruction.

As an example, a floating-point unit (FPU) in a microprocessor having eight floating-point (FP) registers may have a tag register encoded with 16 bits with 2 bits for each FP register. A new tag register may be defined having eight bits with one bit for each FP register. A new save instruction, therefore, needs to perform a conversion of the 16-bit tag register to an 8-bit tag register efficiently.

Therefore there is a need to provide an efficient technique to convert the encoded tag bits.

SUMMARY

The present invention is a method and apparatus for converting a first tag word into a second tag word which correspond to a set of registers. Adjacent bits in the first tag word are determined which correspond to different registers in the set of registers. The determined adjacent bits in the first tag word are extracted and deposited into corresponding adjacent bit positions in the second tag word.

BRIEF DESCRIPTION OF THE DRAWINGS

The features and advantages of the present invention will become apparent from the following detailed description of the present invention in which.

DESCRIPTION

The present invention is a method and apparatus for converting an encoded tag word into a compact tag word. Two operations are defined: an extracting operation and a depositing operation. Adjacent bits in the encoded tag word are extracted and deposited into the compact tag word. The technique provides a fast and efficient way to convert the encoded tag word.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Figure 1:
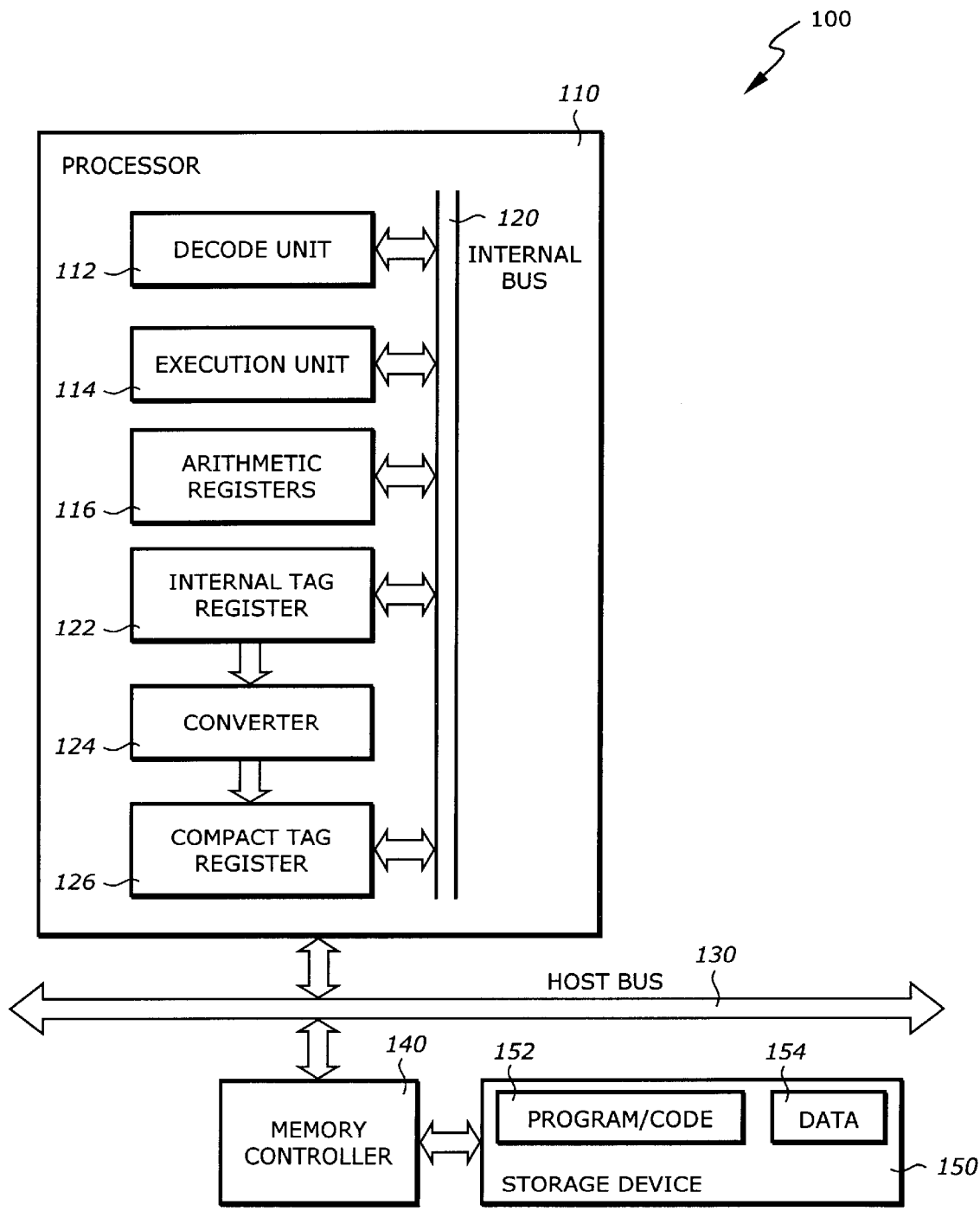
FIG. 1 is a diagram illustrating one embodiment of a system in accordance with the teachings of the present invention.

FIG. 1 is a diagram illustrating one embodiment of a computer system 100 in which one embodiment of the present invention may be utilized. The computer system 100 comprises a processor 110, a host bus 130, a memory controller 140, and a storage device 150.

The processor 110 represents a central processing unit of any type of architecture, such as complex instruction set computers (CISC), reduced instruction set computers (RISC), very long instruction word (VLIW), or hybrid architecture. While this embodiment is described in relation to a single processor computer system, the invention could be implemented in a multi-processor computer system.

The memory controller 140 provides various access functions to the storage device 150. The memory controller 140 is coupled to the host bus 130 to allow the processor to access the storage device 150. The storage device 150 represents one or more mechanisms for storing information. For example, the storage device 150 may include non-volatile or volatile memories. Examples of these memories include flash memory, read only memory (ROM), or random access memory (RAM).

FIG. 1 also illustrates that the storage device 150 has stored therein program code 152 and data 154. The program code 152 represents the code using any and/or all of the techniques in the present invention. The data 154 stores data used by the program code 152, graphics data and temporary data. Of course, the storage device 150 preferably contains additional software (not shown), which is not necessary to understanding the invention.

FIG. 1 additionally illustrates that the processor 110 includes a decode unit 112, an execution unit 114, a set of arithmetic registers 116, an internal tag register 122, a converter 124, a compact tag register 126, and an internal bus 120. Of course, the processor 110 contains additional circuitry, which is not necessary to understanding the invention. The decode unit 112 is used for decoding instructions received by processor 110 into control signals and/or microcode entry points. In response to these control signals and/or microcode entry points, the execution unit 114 performs the appropriate operations.

The arithmetic registers 116 represent a storage area on processor 110 for storing information, including control/status information, numeric data. In one embodiment, the arithmetic registers 116 include a number of floating-point registers used by a floating-point unit. The internal tag register 122 stores encoded status bits that represent the statuses or conditions of the arithmetic registers 116. The converter 124 is an abstract representation of a module that performs the conversion of the internal tag register to the compact tag register 126. The converter 124 may represent a microcode routine or a hardware logic circuit. The compact tag register 126 stores the encoded status bits in compact form.

Figure 2:
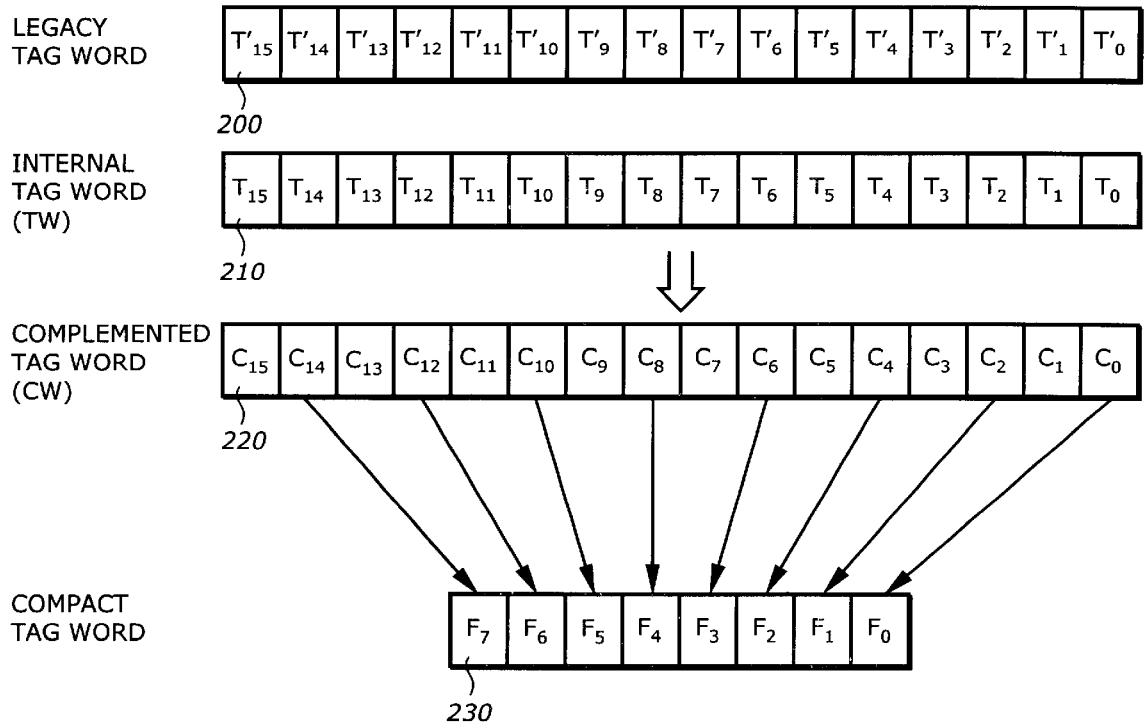
FIG. 2 is a diagram illustrating various tag words according to one embodiment of the invention.

FIG. 2 is a diagram illustrating a legacy tag word 200, an internal tag word 210, a complemented tag word 220, and a compact tag word 230 according to one embodiment of the invention. The legacy tag word 200 may represent an existing tag word of an execution unit. For example, the legacy tag word 200 may represent the tag word of the floating-point unit (e.g., the x87) as manufactured by Intel Corporation at Santa Clara, Calif. The internal tag word 210 may represent a subset of the information in the legacy tag word 200.

The internal tag word (TW) 210 has 16 bits T0 to T15. The complemented tag word (CW) 220 has 16 bits C0 to C15. The compact tag word 230 has 8 bits F0 to F7. The internal tag word 210, the complemented tag word 220, and the compact tag word 230 encode the statuses or conditions of the eight floating-point registers as follows.

| Floating-point Register. | Internal tag word | Complemented tag word | Compact tag word |
|---|---|---|---|
| 0 | T0–T1 | C0–C1 | F0 |
| 1 | T2–T3 | C2–C3 | F1 |
| 2 | T4–T5 | C4–C5 | F2 |
| 3 | T6–T7 | C6–C7 | F3 |
| 4 | T8–T9 | C8–C9 | F4 |
| 5 | T10–T11 | C10–C11 | F5 |
| 6 | T12–T13 | C12–C13 | F6 |
| 7 | T14–T15 | C14–C15 | F7 |

The bits of the legacy tag word 200 are encoded according to the status of the floating-point registers as follows:

00: valid, 01: zero, 10: special, 11: empty

The internal tag word 210 maintains valid and invalid information, encoded as 00 and 11, respectively. This internal representation allows easy conversion to the legacy tag word 200 required by the old save instruction.

The bits of the complemented tag word 220 are the complements of the tag bits of the internal tag word 220. The complemented tag bits are therefore:

11: valid, 10: zero, 01: special, 00: empty

The bits of the compact tag word 230 are encoded according to the status of the eight floating-point registers as follows:

0: invalid, 1: valid.

An invalid bit in the compact tag word 230 corresponds to the empty encoding "11" in the internal tag word 210 and "00" in the complemented tag word 220. A valid bit in the compact tag word 230 corresponds to the encodings "00" in the internal tag word 210 and "11" in the complemented tag word. The compact tag word 230 and the internal tag word 210 do not have encodings for the status "zero" and "special". These two encodings can be performed by other mechanisms. One such mechanism is to process these conditions by a corresponding routine in the microcode.

It is observed that the encodings of the "invalid" and "valid" conditions in the complemented tag word 220 involve duplicated or redundant bits. The "invalid" (or "empty") condition is encoded as a bit pair "00" corresponding to the encoding "0" in the compact tag word 230. The "valid" condition is encoded as a bit pair "11" corresponding to the encoding "1" in the compact tag word 230. Therefore, a direct conversion of the complemented tag word to the compact tag word is to extract one bit from the bit pair of the corresponding register.

FIG. 2 shows an extraction of the bits from the complemented tag word 220 to the compact tag word 230 as follows:

| | | |
|---|---|---|
| C0 | ---> | F0 |
| C2 | ---> | F1 |
| C4 | ---> | F2 |
| C6 | ---> | F3 |
| C8 | ---> | F4 |
| C10 | ---> | F5 |
| C12 | ---> | F6 |
| C14 | ---> | F7 |

Other extractions or mappings are possible. For example, another extraction is:

| | | |
|---|---|---|
| C1 | ---> | F0 |
| C3 | ---> | F1 |
| C5 | ---> | F2 |
| C7 | ---> | F3 |
| C9 | ---> | F4 |
| C11 | ---> | F5 |
| C13 | ---> | F6 |
| C15 | ---> | F7 |

These extractions or mappings, however, involve eight separate extractions from the complemented tag word 220 and eight separate depositings to the compact tag word 230. For fast conversion and simplified hardware, more efficient mappings are desired.

An efficient mapping from the complemented tag word 220 to the compact tag word 230 is to map adjacent bits to adjacent bits. By mapping adjacent bits to adjacent bits, the number of extractions and depositings is reduced.

Figure 3:
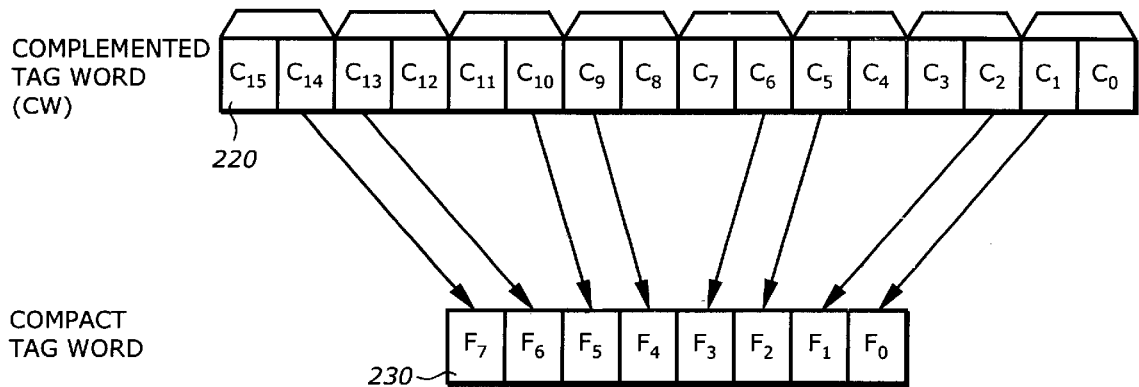
FIG. 3 is a diagram illustrating a correspondence between the complemented tag word and the compact tag word according to one embodiment of the invention.

FIG. 3 is a diagram illustrating a mapping between the complemented tag word and the compact tag word according to one embodiment of the invention.

The mapping shown in FIG. 3 maps the bits in the complemented tag word 220 to the compact tag word 230 as follows;

| | | |
|---|---|---|
| C1 | ---> | F0 |
| C2 | ---> | F1 |
| C5 | ---> | F2 |
| C6 | ---> | F3 |
| C9 | ---> | F4 |
| C10 | ---> | F5 |
| C13 | ---> | F6 |
| C14 | ---> | F7 |

This mapping is efficient because it maps adjacent bits to adjacent bits. As shown in FIG. 3, these adjacent bits form bit pairs and the mapping maps the following bit pairs:

| | | |
|---|---|---|
| C1–C2 | ---> | F0–F1 |
| C5–C6 | ---> | F2–F3 |
| C9–C10 | ---> | F4–F5 |
| C13–C14 | ---> | F6–F7 |

If extractions and depositings are performed in groups of adjacent bits, the above mapping reduces the number of extractions and depositings in half (compared to the direct mapping).

Figure 4:
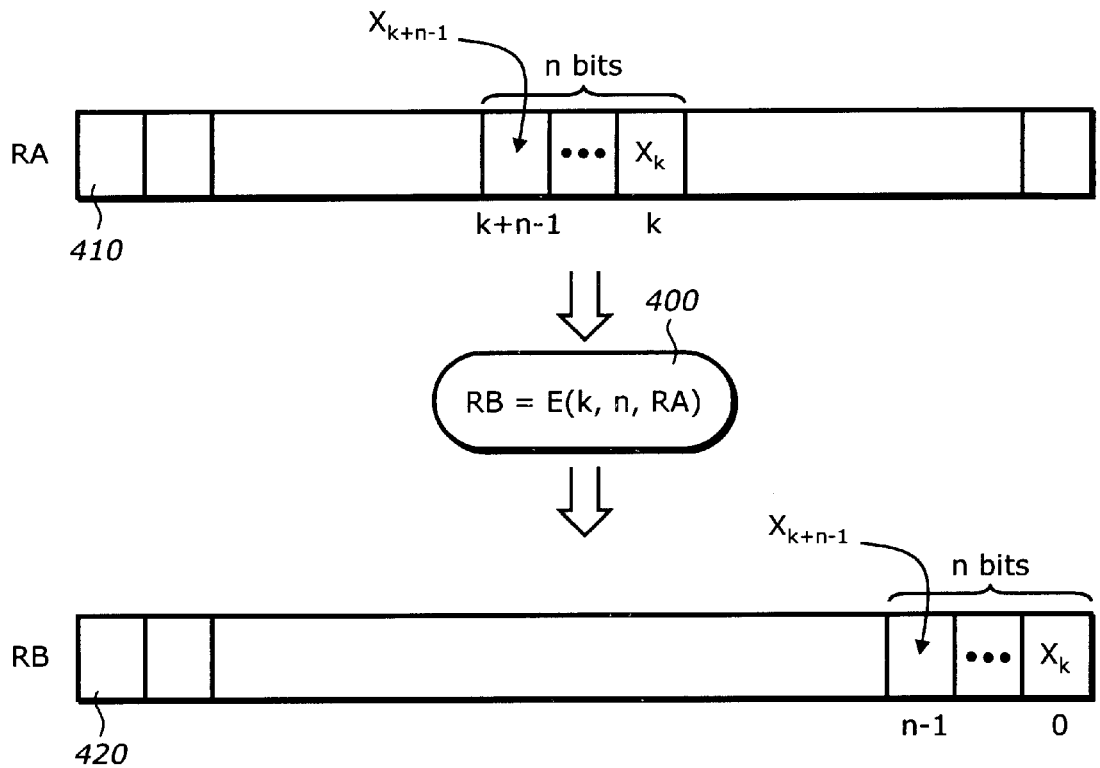
FIG. 4 is a diagram illustrating an extracting operation according to one embodiment of the invention.

FIG. 4 is a diagram illustrating an extracting operation 400 according to one embodiment of the invention. The extracting operation 400 extracts adjacent bits from a register RA 410 to a register RB 420. The extracting operation 400 may be implemented in hardware, software, or microcode. The extracting operation 400 is, therefore, an abstract representation of an extracting element, an extracting function, or an extracting microcode routine.

The extracting operation 400 is described as:

$$RB=E(k, n, RA)$$

Where RA is the source register, RB is the destination register, E (.) is the extracting operation, k is the starting bit position of the bits to be extracted, and n is the number of bits to be extracted starting from bit position k. The extracted bits are deposited into the rightmost bit position of the destination register RB. As shown in FIG. 4, the extracting operation extracts n bits RA[k: k+n−1] and deposits to RB[0: n−1]. The extracting operation can be implemented in hardware by using data selectors or multiplexers to route the selected bits to the destination.

Figure 5:
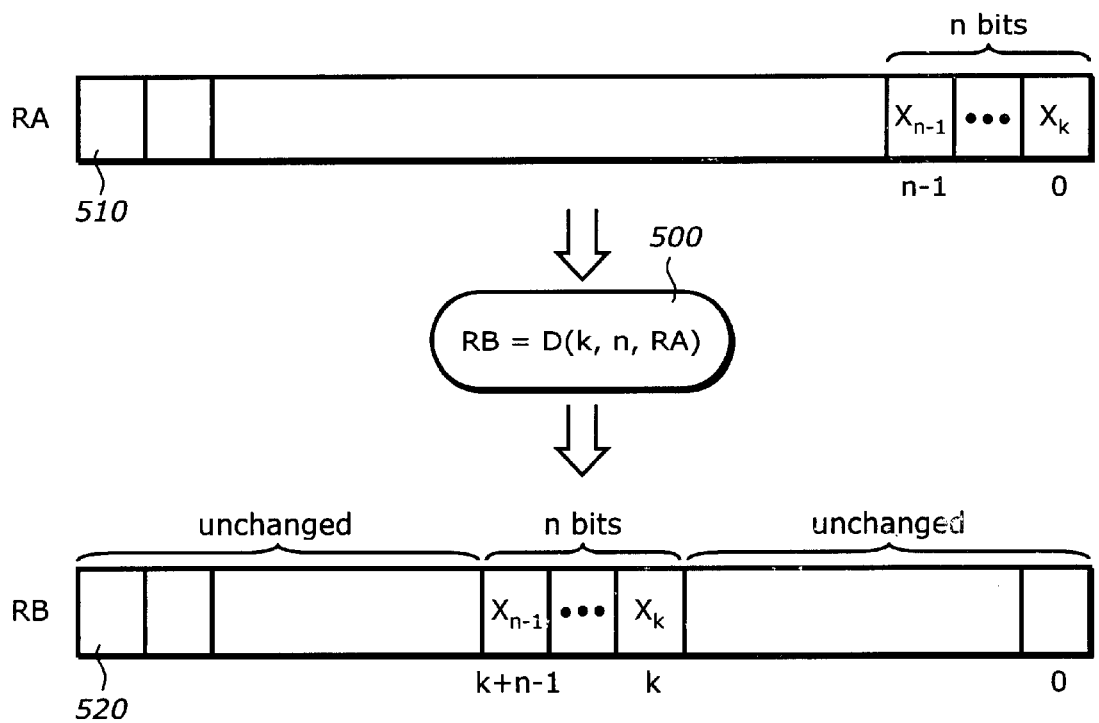
FIG. 5 is a diagram illustrating a depositing operation according to one embodiment of the invention.

FIG. 5 is a diagram illustrating a depositing operation 500 according to one embodiment of the invention. The depositing operation 500 deposits adjacent bits from a register RA 510 to a register RB 520. The depositing operation 500 may be implemented in hardware, software, or microcode. The depositing operation 500 is, therefore, an abstract representation of a depositing element, a depositing function, or a depositing microcode routine.

The depositing operation 500 is described as:

$$RB=D(k, n, RA)$$

Where RA is the source register, RB is the destination register, D (.) is the depositing operation, k is the starting bit position of the bits to be deposited into, and n is the number of bits to be deposited starting from bit position k. The deposited bits are extracted from the rightmost bit position of the destination register RB. As shown in FIG. 5, the depositing operation extracts n bits RA[0: n−1] and deposits to RB[k: k+n−1]. The depositing operation can be implemented in hardware by using a data steering circuit such as multiplexers to steer the rightmost bits to the selected destination positions.

Figure 6:
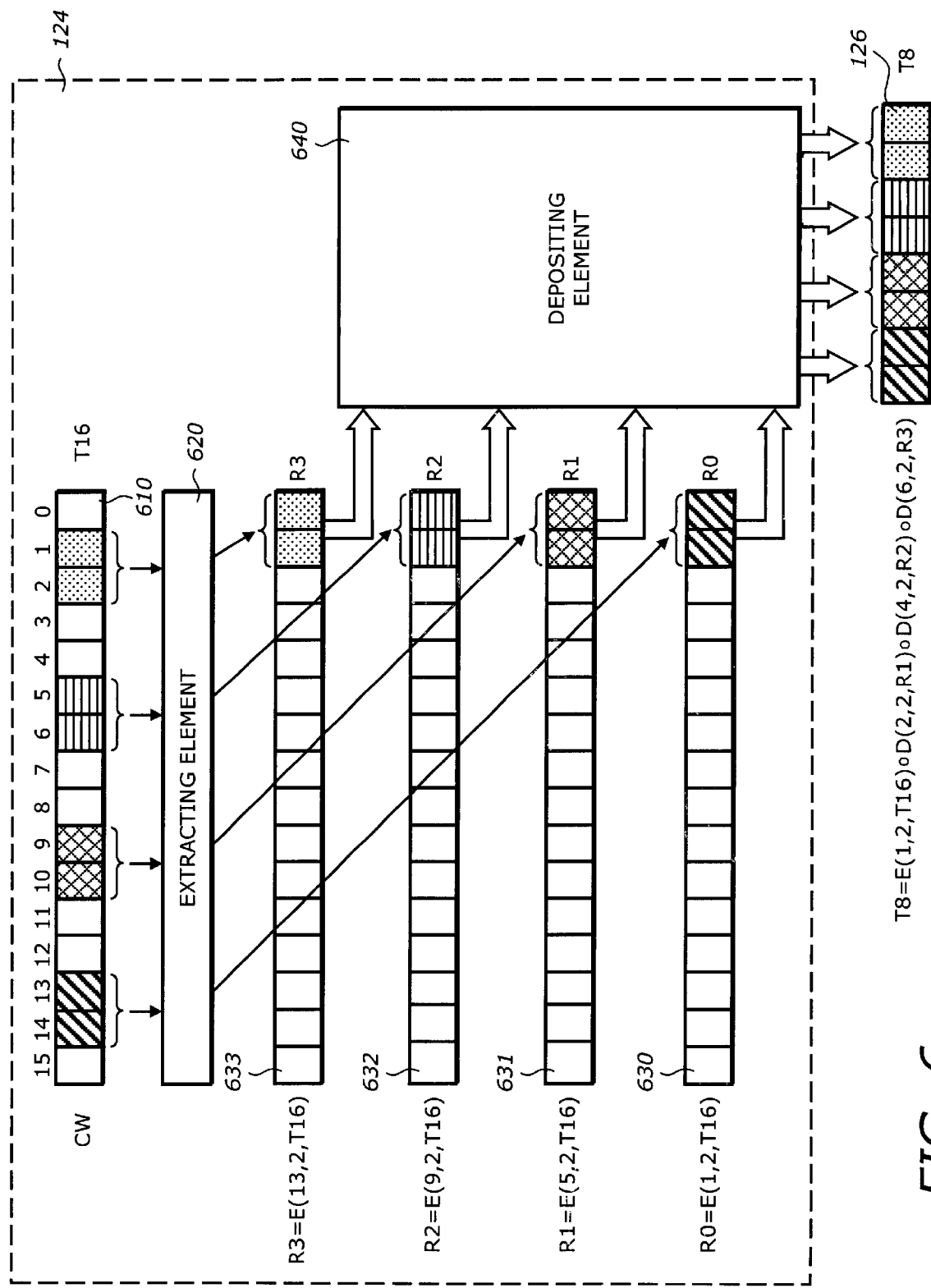
FIG. 6 is a diagram illustrating a merging of the compact tag word according to one embodiment of the invention.

FIG. 6 is a diagram illustrating a tag converter 600 according to one embodiment of the invention. The tag converter 600 may be implemented by hardware, software, or microcode. The conversion of the floating-point tag word involves a series of extracting and depositing operations. The converter 600 includes a complemented tag register T16 610, an extracting element 620, intermediate registers 630, 631, 632, and 633, a depositing element 640, and the compact tag register 126.

The complemented tag register T16 610 stores the complemented tag word 210 shown in FIG. 2. The compact tag register T8 126 stores the compact tag word 230 as shown in FIG. 2. The extracting and depositing elements 620 and 640 perform extracting and depositing operations, respectively, and can be implemented in hardware, software, or microcode. The intermediate registers 630, 632, 632, and 633, may be any storage devices.

The series of operations in the conversion include the following extracting and depositing operations:

$$R3=E(13, 2, T16)$$

$$R2=E(9, 2, T16)$$

$$R1=E(5, 2, T16)$$

$$R0=E(1, 2, T16)$$

$$T8=D(0, 2, R0)$$

$$T8=D(2, 2, R1)$$

$$T8=D(4, 2, R2)$$

$$T8=D(6, 2, R3)$$

It is observed that the operations R0=E(1, 2, T16) and T8=D(0, 2, R0) can be combined into one operation:

$$T8=E(1,2, T16)$$

Therefore, R0 is not needed and is optional. The total number of intermediate registers is three (R3, R2, and R1) and the total number of operations is seven (four extracting operations and three depositing operations). The extracting element 620 performs the four extracting operations. The depositing element 640 performs the three depositing operations.

The present invention provides a fast and efficient technique to convert a 16-bit tag word into an 8-bit tag word. The technique maps adjacent bits from the 16-bit tag word to adjacent bits in the 8-bit tag word. The conversion involves half the number of extracting and depositing operations.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:

determining at least two adjacent bits in a first tag word, the at least two adjacent bits corresponding to registers in a set of execution registers;

extracting the determined at least two adjacent bits in the first tag word; and depositing the extracted at least two adjacent bits into at least two corresponding adjacent bit positions in a second tag word, the first and second tag words corresponding to the set of execution registers, the second tag word being more compact than the first tag word.

2. The method of claim 1 wherein the set of execution registers comprise floating-point registers corresponding to a floating-point unit.

3. The method of claim 2 wherein the first tag word comprises encoded bits representing one of a valid condition, a zero condition, a special condition, and an empty condition.

4. The method of claim 3 wherein the valid condition, the zero condition, the special condition, and the empty condition are encoded as 00, 01, 10, and 11, respectively.

5. The method of claim 4 wherein the second tag word comprises encoded bits representing one of a valid condition and an invalid condition.

6. The method of claim 5 wherein the valid condition and the invalid condition are encoded as 0 and 1, respectively.

7. The method of claim 6 wherein the first tag word comprises sixteen encoded bits corresponding to eight registers in the set of execution registers, the sixteen encoded bits comprising eight pairs of bits, each pair of bits representing one of the valid condition, the zero condition, the special condition, and the empty conditions.

8. The method of claim 7 wherein the second tag word comprises eight encoded bits corresponding to the eight registers in the set of execution registers, each of the eight encoded bits representing one of the valid and invalid conditions.

9. The method of claim 1 wherein the extracting stores the determined at least two adjacent bits to an intermediate register.

10. The method of claim 9 wherein the depositing transfers the determined at least two adjacent bits stored in the intermediate register to the second tag word.

11. An apparatus comprising:
an extracting element coupled to a first tag register for extracting at least two adjacent bits in a first tag word stored in the first tag register, the adjacent bits being redundant bits; and
a depositing element coupled to a second tag register for depositing the extracted at least two adjacent bits into at least two corresponding adjacent bit positions in the second tag register, the second tag register storing a second tag word, the first and second tag registers corresponding to a set of execution registers, the second tag word being more compact than the first tag word.

12. The apparatus of claim 11 wherein the set of execution registers comprise floating-point registers corresponding to a floating-point unit.

13. The apparatus of claim 12 wherein the first tag word comprises encoded bits representing one of a valid condition, a zero condition, a special condition, and an empty condition.

14. The apparatus of claim 13 wherein the valid condition, the zero condition, the special condition, and the empty condition are encoded as 00, 01, 10, and 11, respectively.

15. The apparatus of claim 14 wherein the second tag word comprises encoded bits representing one of a valid condition and an invalid condition.

16. The apparatus of claim 15 wherein the valid condition and the invalid condition are encoded as 0 and 1, respectively.

17. The apparatus of claim 16 wherein the first tag word comprises sixteen encoded bits corresponding to eight registers in the set of execution registers, the sixteen encoded bits comprising eight pairs of bits, each pair of bits representing one of the valid condition, the zero condition, the special condition, and the empty conditions.

18. The apparatus of claim 17 wherein the second tag word comprises eight encoded bits corresponding to the eight registers in the set of execution registers, each of the eight encoded bits representing one of the valid and invalid conditions.

19. The apparatus of claim 11 further comprising an intermediate register coupled to the extracting element for storing the extracted at least two adjacent bits.

20. The apparatus of claim 19 wherein the depositing element transfers the determined at least two adjacent bits stored in the intermediate register to the second tag register.

21. A processor comprising:
an arithmetic unit having first and second tag registers, the first and second tag registers storing first and second tag words, respectively, the first and second tag registers corresponding to a set of execution registers; and
a converter coupled to the first and second tag registers to convert the first tag word into the second tag word, the second tag word being more compact than the first tag word, the converter comprising:
an extracting element coupled to the first tag register for extracting at least two adjacent bits, at a time, in the first tag word, the at least two adjacent bits being redundant bits, and
a depositing element coupled to the second tag register for depositing the extracted at least two adjacent bits into at least two corresponding adjacent bit positions in the second tag register.

22. The processor of claim 21 wherein the converter further comprising an intermediate register coupled to the extracting element for storing the at least two extracted adjacent bits.

23. The processor of claim 22 wherein the depositing element transfers the determined at least two adjacent bits stored in the intermediate register to the second tag register.

24. The processor of claim 21 wherein the set of execution registers comprise floating-point registers corresponding to a floating-point unit.

25. The processor of claim 24 wherein the first tag word comprises encoded bits representing one of a valid condition, a zero condition, a special condition, and an empty condition.

26. The processor of claim 25 wherein the valid condition, the zero condition, the special condition, and the empty condition are encoded as 00, 01, 10, and 11, respectively.

27. The processor of claim 26 wherein the second tag word comprises encoded bits representing one of a valid condition and an invalid condition.

28. The processor of claim 27 wherein the valid condition and the invalid condition are encoded as 0 and 1, respectively.

29. The processor of claim 28 wherein the first tag word comprises sixteen encoded bits corresponding to eight registers in the set of execution registers, the sixteen encoded bits comprising eight pairs of bits, each pair of bits representing one of the valid condition, the zero condition, the special condition, and the empty conditions.

30. The processor of claim 29 wherein the second tag word comprises eight encoded bits corresponding to the eight registers in the set of execution registers, each of the eight encoded bits representing one of the valid and invalid conditions.

* * * * *